United States Patent
Danneels et al.

(10) Patent No.: US 6,850,975 B1
(45) Date of Patent: Feb. 1, 2005

(54) WEB SITE MONITORING

(75) Inventors: Gunner D. Danneels, Beaverton, OR (US); Peter A. Nee, Beaverton, OR (US); James Tsai, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/450,704

(22) Filed: Nov. 29, 1999

(51) Int. Cl.[7] .................. G06F 15/16; G06F 15/173
(52) U.S. Cl. ..................... 709/224; 709/218
(58) Field of Search ................. 709/203, 217–218, 709/224, 311, 204; 707/10, 513; 705/26–27

(56) References Cited

U.S. PATENT DOCUMENTS

| | | | | |
|---|---|---|---|---|
| 5,940,834 A | * | 8/1999 | Pinard et al. ............... 707/102 |
| 5,999,941 A | * | 12/1999 | Andersen ................ 707/103 R |
| 6,052,730 A | * | 4/2000 | Felciano et al. ............ 709/225 |
| 6,055,541 A | * | 4/2000 | Solecki et al. .......... 707/103 R |
| 6,112,240 A | * | 8/2000 | Pogue et al. ................ 709/224 |
| 6,263,365 B1 | * | 7/2001 | Scherpbier .................. 709/218 |
| 6,286,043 B1 | * | 9/2001 | Cuomo et al. .............. 709/223 |
| 6,324,565 B1 | * | 11/2001 | Holt, III ..................... 709/203 |
| 6,347,333 B2 | * | 2/2002 | Eisendrath et al. ....... 7009/217 |
| 6,363,398 B1 | * | 3/2002 | Andersen ................ 707/103 R |
| 6,601,087 B1 | * | 7/2003 | Zhu et al. ................... 709/205 |
| 6,643,696 B2 | * | 11/2003 | Davis et al. ................ 709/224 |
| 6,714,931 B1 | * | 3/2004 | Papierniak et al. .......... 707/10 |
| 6,725,255 B1 | * | 4/2004 | Hass et al. .................. 709/206 |

\* cited by examiner

*Primary Examiner*—Jack B. Harvey
*Assistant Examiner*—Douglas Blair
(74) *Attorney, Agent, or Firm*—Fish & Richardson P.C.

(57) ABSTRACT

A web site system that dynamically generates web pages for a user includes a monitoring system. The monitoring system stores a copy of the dynamically generated web page and displays the copy of the web page to a web site representative on request. This permits the representative to make a more accurate analysis of a user's problem or question, thereby improving customer support.

20 Claims, 3 Drawing Sheets

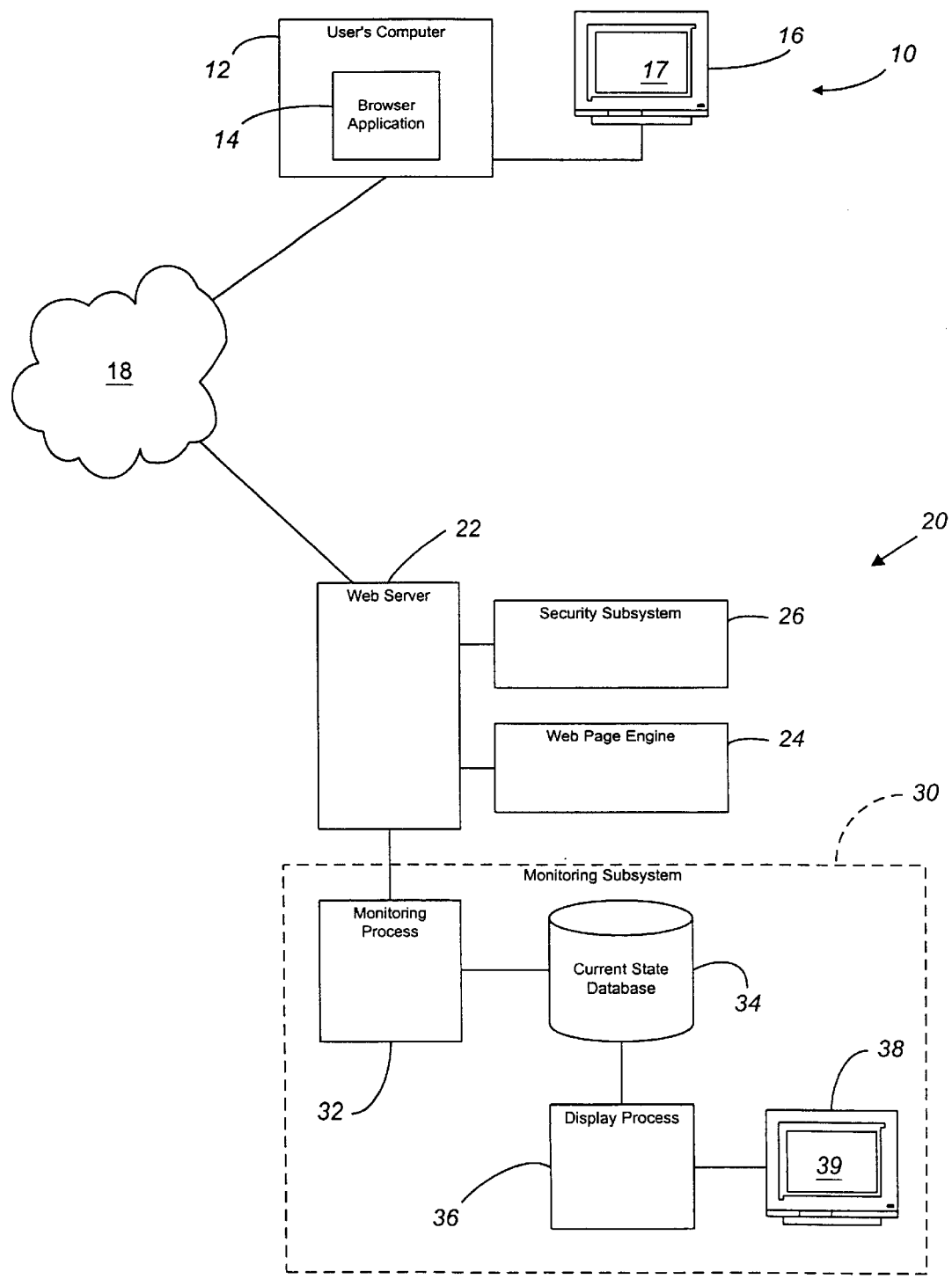

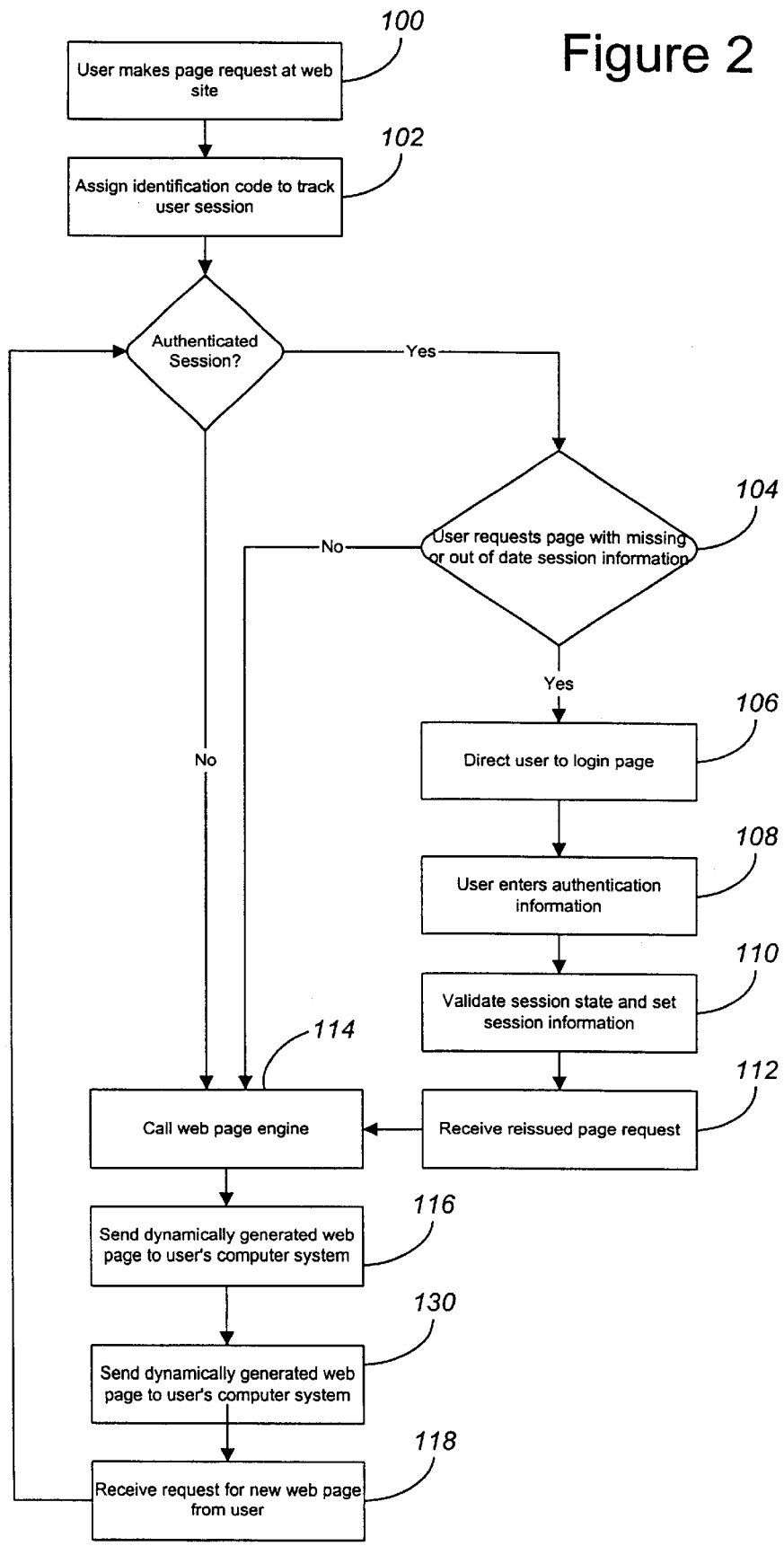

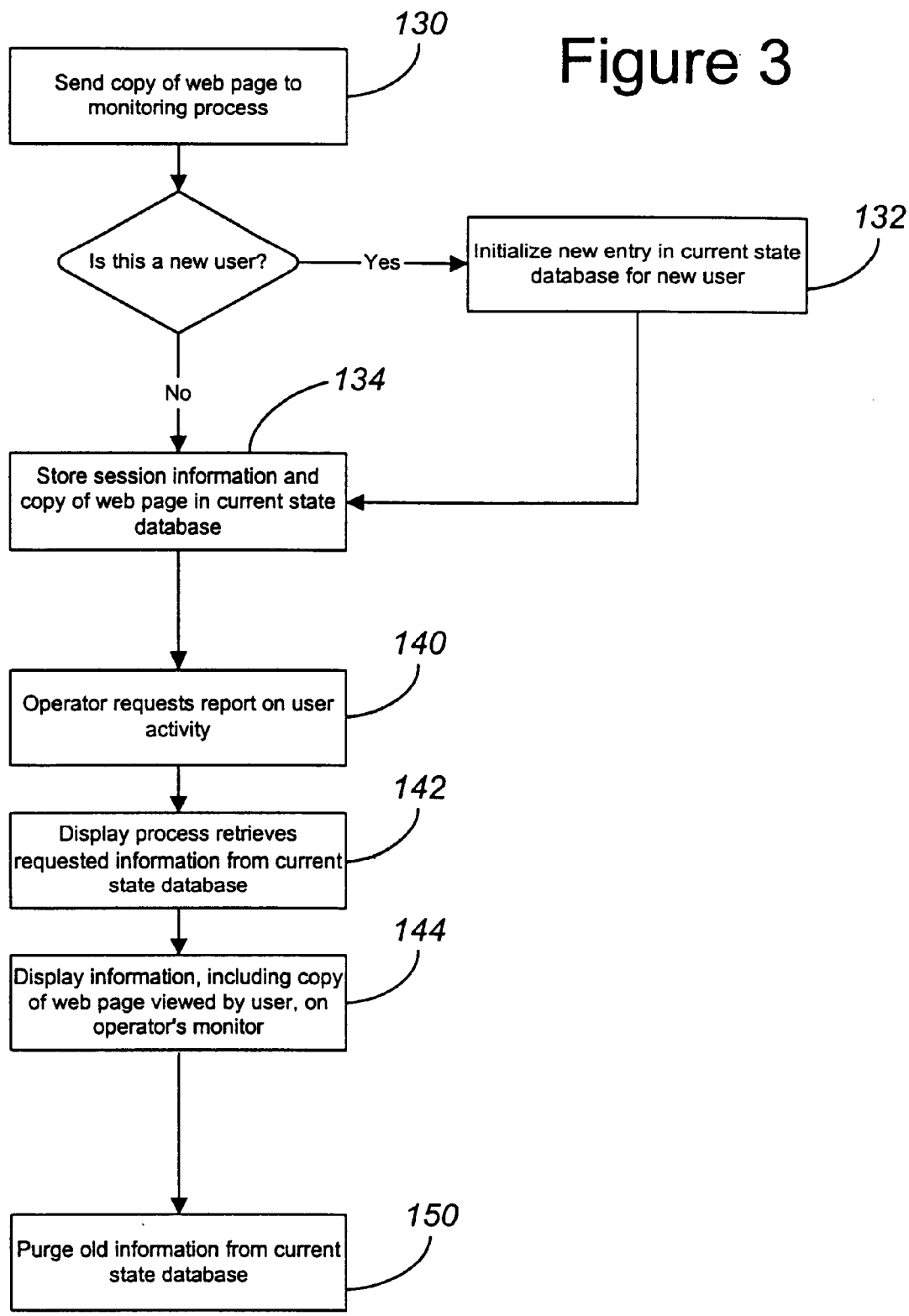

WEB SITE MONITORING

BACKGROUND

The present invention relates to a web site support system, and more particularly to a web site support system that monitors online user sessions.

A web page in a web site, whether an Intranet or Internet site, is generated by a web server. The web servers used at the inception of the Internet rendered static web pages, i.e., the entire content of an individual web page was simply retrieved from a non-volatile storage. Thus, the content of the static web page was the same for each user. More recent web servers generate web pages dynamically, i.e., the content of a web page is assembled "on-the-fly" at the time the web page is accessed. Thus, the content of a dynamically generated web page can vary from user to user and can depend upon user input, user preferences, user profiles, and the like.

Some web site systems include a monitoring subsystem that enables a web site operator to review online user activity. A typical monitoring subsystem generates a log of page hits, i.e., a list that includes the universal resource locator (URL) for each web page visited by each user. This log is stored in a non-volatile storage. The log can be reviewed and filtered by the web site operator to summarize user activity. For example, the web site operator can determine the number of hits on a particular web page. As another example, the web site operator can extract a user session, i.e., a list of the URLs visited by a particular user, from the log.

SUMMARY

In general, the invention is directed to a method of operating a web site. A web page is generated dynamically for a user. The dynamically generated web page is sent to the user, and a copy of the dynamically generated web page is stored. A request is received from a web site representative for information concerning the user, and the copy of the web page is displayed to the representative.

Advantages of the invention may include one or more of the following. The monitoring subsystem increases the information available to the web site operator. The monitoring information is available to a representative of the web site operator on a real-time basis. A customer service or sales representative can view the actual dynamic web page being viewed by a user. In addition, dynamic web pages previously viewed by the user can be retrieved by the representative. This permits the representative to make a more accurate analysis of a user's problem or question, thereby improving customer support. Information concerning the online session of a particular user may easily be extracted from the monitoring subsystem.

Other features and advantages of the invention will become apparent from the following description, including the drawings and the claims.

BRIEF DESCRIPTION OF THE DRAWINGS

FIG. 1 is a schematic block diagram of a web site system that includes a web site monitoring subsystem.

FIG. 2 is a flowchart illustrating a method performed by the web site system.

FIG. 3 is a flowchart illustrating a method performed by the web site monitoring subsystem.

DETAILED DESCRIPTION

FIG. 1 shows a web site system 20 that dynamically generates web pages for display on a user's computer system 10. The web site system includes a monitoring subsystem 30 to provide the web site operator with accurate, timely and complete information about the web pages currently or previously viewed by the user.

To explain the advantages of the monitoring subsystem 30, it should be noted that a conventional monitoring subsystem simply generates a log of page hits. Each time a user accesses a web page, an entry is added to the list indicating the universal resource locator (URL) for the web page, the identity of the user (if available), and possibly the time that the user accessed the web page. Unfortunately, there are several problems with the conventional monitoring subsystem. First, the log may not be available on a real-time basis. For example, the information from the log may be collected daily. Consequently, the web site operator may not be able to determine which web pages users are viewing on a real-time basis. Second, even if the log is available on a real-time basis, the log includes the aggregated information for a large number of users. Consequently, extracting the online session information for a particular user is time consuming. This introduces delays during a customer service call. Third, the full information about the web page displayed to the user is not available to the web site operator. If the web page was generated dynamically, the URL in the page hit list does not fully describe the web page that is actually being viewed by the user. If a user contacts a customer service representative, the representative cannot determine what the user is actually viewing. Consequently, the user must describe the web page and the problem, introducing uncertainty and error.

Unlike prior monitoring subsystems in which only the URL is stored, the monitoring subsystem 30 can display the actual web pages that have been viewed by a particular user to a representative of the web site operator. In short, the monitoring subsystem 30 can capture a "snapshot" of the on-line experience of the web site for each user. Since the customer representative can access this information in real time during a user call, the representative can make a more accurate analysis of a user's problem or question, thereby improving customer support.

As shown in FIG. 1, the web site system 20 is connected to a user's computer system 10 by a computer network 18, such as a local area network (LAN), a wide area network (WAN), an Intranet, or the Internet. The user's computer system 10 may be of conventional construction, including a general purpose programmable computer 12 with a memory and a processor for running a web browser application 14, communications hardware and software that connects the computer 12 to the network 18, and a monitor 16 to display a web page 17 generated by the web site system 20.

The web site system 20 includes a web server 22, a web page engine 24, an optional web access security subsystem 26, and a monitoring subsystem 30. The web server 22 receives requests and user input from the user's computer system 10, and sends web pages generated by the web page engine 24 back to the user's computer system 10. In response to a request by the web server, the web page engine 24 dynamically generates the content of the web page based on previous user input, preferences previously selected by the user, and profile information about the user previously collected by the web site system 20. The web page engine 24 and the security subsystem 26 can be implemented with conventional technology. The web server 22 is capable of directing a copy of the web page received from the web page engine 24 to both the user's computer system 10 and the monitoring subsystem 30. The components of the web site system 20 can be implemented in a single computer or distributed on a computer network. Although most likely implemented as software on conventional programmable digital computers, the components can also be implemented with hardware, firmware, software, or combinations thereof, including application-specific integrated circuits (ASIC).

The monitoring subsystem 30 is linked to the web server 22 and includes a monitoring process 32, a current state database 34, a display process 36. The monitoring system 30 may also include an operator terminal 38 that is accessible to a representative of the web system operator, such as a customer service or sales representative. The monitoring process 32 directs a copy of a web page generated by the web page engine 24 into the current state database 34. The display process 36 can retrieve a copy of a web page stored in the current state database 34 and display the stored web page 39 on the operator terminal 38. The current state database 34 may be implemented with any industrial strength relational database system, and the display process 36 may be the query capability of the database system. The current state database may be stored in volatile or non-volatile storage, such as a random access memory (RAM), or a hard disk drive. The monitoring process, display process and the non-volatile storage can be shared with or implemented as part of other components in the web site system 20.

FIG. 2 shows a method performed by the web site system 20. The method begins when a user first attempts to access a web page on the web site maintained by the web site system 20. Initially, the web server receives this request in step 100, and the user is assigned an identification code in step 102 for the purpose of tracking the user's session. If the web site system is intended to perform an authenticated web session, then the user will submit a page request with either missing or out of date session information in step 104. That is, the security system will either have no record of the session or will have recorded that the session has expired. In this case, in step 106 the web server 22 redirects the user to a log-in page. The user enters the necessary authentication information, such as a user identification number (userID) and a password, in step 108. Assuming the userID and password match the information in the web server's user database, the user is authenticated and the session information is set in step 110. The session information may include the typical active server page (ASP) session variables, including a pointer from the identification code to the userID. Then the web page request is reissued by the user's computer system, and the reissued page request is received by the web server in step 112.

After the web server 22 receives a page request with a valid session state (either because the user has been authenticated or because the web site system does not perform authentication), the web server 22 calls on the web page engine 24 to create a web page in step 114. The web page engine 24 accesses information about the user, such as previous user input, preferences previously selected by the user, and profile information about the user previously collected by the web site system, and dynamically creates the content of the web page. The web page is sent from the web server back to the user's computer system 10 as a standard hypertext markup language (HTML) document in step 116. In addition, the session information and a copy of the HTML document generated by the engine 24 is sent by the web server to the monitoring process 32 in step 130. When the user's computer receives the HTML document, it is displayed as the web page 17 on the user's monitor 16 by the browser application 14. The user may then request a new web page. This request is received by the web server 22 in step 118, and the web server reiterates the process.

As shown in FIG. 3, when the web server 22 receives the personalized web page from the web page engine 24, the session information and a copy of the HTML document generated by the engine 24 is sent to the monitoring process 32 in step 130. If the user is a new user with no session information in the current state database 34, the monitoring process 32 initializes a new entry for the new user in step 132. Then the monitoring process 32 stores the session information, including the pointer to the userID, and the copy of the web page in the current state database 34 in step 134. The stored information can also include other session information, such as the URL of the web page request, and the time that the web page request was received by the web server. The stored information is then available to the display process. The session information and the copy of the web page can be indexed, e.g., on the user's identification number. The online session information, including the web page currently being viewed, for a particular user can be extracted quickly from the current state database 34 using the index.

The information stored in the current state database 34 can be accessed by the web site operator, such as customer service representative, to improve customer service. Specifically, the operator requests a report of current user activity in step 140. In step 142 the display process retrieves requested information from the current state database 34, and converts the information into a format useful to the operator. This current activity report can include, for example, the number of users currently accessing the web site or the number of users accessing a particular web page. Specifically, the operator can ask to view a web page currently being viewed or recently viewed by a particular user. In this case, the display process retrieves a copy of the appropriate HTML document from the current state database 34, and returns the web page to the display process so that it is displayed on the operator's terminal 38 in step 144. Thus, the representative can view the actual web page being viewed the user, and can provide superior customer service.

Eventually, old information in the current state database 34 will need to be purged in step 150 to prevent the current state database 34 from expanding without limit. For example, the session information and all the HTML documents from a particular user session can be flushed a predetermined time after the user's session ends. Alternatively, the HTML document can be flushed a predetermined time after the user leaves the associated web page. Alternatively, the current state database 34 can store a predetermined number of web pages for each user, and discard the user's oldest web page each time a new page is stored. Alternatively, if the capacity of the non-volatile storage is sufficient, the web pages can be stored permanently until copied is into a backup storage.

The present invention has been described in terms of a number of implementations. The invention, however, is not limited to the implementations depicted and described. Rather, the scope of the invention is defined by the appended claims.

What is claimed is:

1. A method of operating a web site, comprising:
dynamically generating a web page for a user;
sending the dynamically generated web page from a server at a web site to the user at a client system;
storing a copy of the dynamically generated web page as a markup language document in a non-volatile storage of a monitoring subsystem of the web site in association with user information, the markup language document being created each time a cope of he dynamically generated web page is stored;

receiving a request from a web site representative for information concerning the user; and displaying the copy of the markup language document from the non-volatile storage to the representative to provide the copy of the dynamically generated web page to the representative.

2. The method of claim 1, wherein the web page is dynamically generated in response to a user request received by the web site.

3. The method of claim 2, wherein the user request is received and the web page is sent over a network.

4. The method of claim 1, wherein the web page is a web page being viewed by the user at a time the request is received from the web site representative.

5. The method of claim 4, wherein a plurality of web pages are generated and stored, and the method further comprises determining which of the plurality of web pages is the web page being viewed by the user.

6. The method of claim 1, wherein the web page is a web page previously viewed by the user at a time the request is received from the web site representative.

7. The method of claim 6, wherein a plurality of web pages are generated and stored, and the method further comprises displaying a series of web pages previously viewed by the user.

8. The method of claim 1, wherein the copy of the web page is stored in a database of the monitoring subsystem.

9. The method of claim 1, further comprising storing session information with the copy in the database.

10. The method of claim 9, wherein the session information includes one or more of a user identification, a universal resource locator identifying the web page, and a time that the web site receives a web page request from the user.

11. The method of claim 1, wherein the web page is stored as an HTML document.

12. The method of claim 1, further comprising removing the copy of the web page from storage.

13. The method of claim 12, wherein the copy of the web page is removed a predetermined time after the user ends a session.

14. The method of claim 12, wherein the copy of the web page is removed a predetermined time after the user leaves the web page.

15. A web site system, comprising:

a web page engine to dynamically generate a web page;

a web server to send the dynamically generated web page to a user at a client;

a monitoring subsystem to hold a copy of the dynamically generated web page as a markup language document in a non-volatile storage in association with user information, the markup language document being created each time a copy of the dynamically generated web page is held in the monitoring system; and a processor configured to receive a request from a web site representative for information concerning the user and display the copy of the markup language document from the non-volatile storage to the representative to provide the copy of the dynamically generated web page to the representative.

16. The system of claim 15, wherein the web page is a web page being viewed by the user at a time the request is received from the web site representative.

17. The system of claim 15, wherein the web page is a web page previously viewed by the user at a time the request is received from the web site representative.

18. The system of claim 15, wherein the processor is configured to remove the copy of the web page from the monitoring subsystem.

19. A web site system, comprising:

means for dynamically generating a web page at a server in response to a request from a user at a client; and means for storing a copy of the dynamically generated web page as a markup language document in a non-volatile storage in association with user information and providing the copy of the markup language document from the non-volatile storage to a web site representative in response to a request from the representative to provide the copy of the dynamically generated web page to the representative, the markup language document being created each time a copy of the dynamically generated web page is stored.

20. An article, comprising a computer readable storage medium for storing instructions to cause a computer system to:

dynamically generate a web page for a user;

send the dynamically generated web page from a server to the user at a client system;

storing a copy of the dynamically generated web page as a markup language document in a non-volatile storage of a monitoring subsystem of the web site in association with user information, the markup language document being created each time a copy of the dynamically generated web page is stored;

receiving a request from a web site representative for information concerning the user; and displaying the copy of the markup language document from the non-volatile storage to the representative to provide the copy of the dynamically generated web page to the representative.

* * * * *